Figure 1:
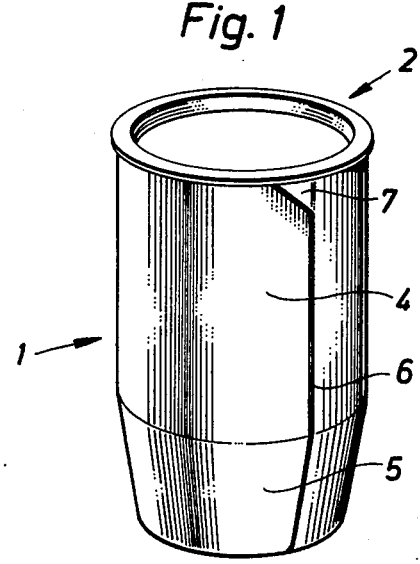

United States Patent [19]

Knutsson

[11] 4,129,467
[45] Dec. 12, 1978

[54] METHOD FOR MAKING PACKING CONTAINERS

[75] Inventor: Kent I. Knutsson, Landskrona, Sweden

[73] Assignee: AB Ziristor, Lund, Sweden

[21] Appl. No.: 789,246

[22] Filed: Apr. 20, 1977

Related U.S. Application Data

[63] Continuation of Ser. No. 621,598, Oct. 10, 1975, abandoned.

[30] Foreign Application Priority Data

Oct. 18, 1974 [SE] Sweden .............................. 74131525

[51] Int. Cl.² .......................... B29C 27/02; B32B 31/26
[52] U.S. Cl. ........................................ 156/84; 53/441; 53/470; 53/471; 53/377; 156/85; 156/86; 156/217; 156/218; 229/1.5 B
[58] Field of Search ................ 220/67; 229/1.5 B, 5.6; 156/84, 85, 86, 292, 218, 217; 264/45.1, 46.4; 53/30 R, 30 S, 36, 37, 39, 42; 93/36.05, 36.1, 59 R, 94 F, 94 C, DIG. 1

[56] References Cited

U.S. PATENT DOCUMENTS

| | | | |
|---|---|---|---|
| 2,757,848 | 8/1956 | Elam | 229/56 |
| 2,859,575 | 11/1958 | Lehman | 93/36.5 |
| 2,969,901 | 1/1961 | Behrens | 229/1.5 B |
| 2,989,785 | 6/1961 | Stahl | 156/86 |
| 3,246,786 | 4/1966 | Holly | 229/1.5 B |
| 3,312,383 | 4/1967 | Shapiro et al. | 229/1.5 B |
| 3,438,824 | 4/1969 | Balamuth | 229/1.5 B |
| 3,440,794 | 4/1969 | Mueller | 53/37 |
| 3,441,173 | 4/1969 | Edwards | 229/1.5 B |
| 3,441,192 | 4/1969 | Metzler et al. | 229/1.5 B |
| 3,454,208 | 7/1969 | Amberg et al. | 220/67 |
| 3,468,467 | 9/1969 | Amberg | 229/1.5 B |
| 3,577,700 | 5/1971 | Bippus et al. | 53/30 S |
| 3,767,496 | 10/1973 | Amberg et al. | 156/86 |

*Primary Examiner*—Caleb Weston
*Attorney, Agent, or Firm*—Burns, Doane, Swecker & Mathis

[57] ABSTRACT

A packing container is formed from laminated material including a carrier layer of foamed plastics and has a generally tubular part and an end closure in the form of an end plate, the peripheral area of the latter is sealed to a region of the tubular part of the container at a region where the tubular part is folded in by shrinkage to fit against the underside of the end plate.

3 Claims, 3 Drawing Figures

U.S. Patent  Dec. 12, 1978  4,129,467

METHOD FOR MAKING PACKING CONTAINERS

This is a continuation, of application Ser. No. 621,598 filed Oct. 10, 1975, abandoned.

The present invention concerns a packing container of a laminated material which is formable by a shrinking process based on the effect of heat and which comprises a carrier layer of foamed plastics, which container has a substantially tubular part and at least one end plate.

The present invention also concerns a method for the manufacture of packing containers of this type.

In the manufacture of packing containers of the disposable type, for example for liquid foods, at present a laminated material is used, inter alia, which comprises a carrier layer of foamed plastics with thinner layers of a homogeneous plastic material applied on either side. This material has many advantages, such as being very rigid, thanks to its "joist construction". Furthermore it is light and cheap and has good heat insulating properties. One disadvantage, however, is that the material can only be formed by folding and not by thermoforming, since the material, if it is subjected simultaneously to heat and to pressure, is compressed so that the cellular structure of the carrier layer is destroyed. To avoid this disadvantage, the packing material has been developed so that a lenticular or elongated shape has been imparted to the cells making up the foamed plastics by a stretching process carried out after the extrusion of the material. Since the cells normally are spherical and endeavour to assume their normal shape, the cells will, when the finished material is heated up again to softening, revert as far as possible to the spherical shape, thus causing the material to shrink. This means that a thermoforming of the material around e.g. a profiled mandrel can be carried out without the cell structure being altered or major variations in thickness being observed.

Such a material has been used e.g. for the manufacture of a protective cover for glass bottles. To this end a sleeve was formed of the material, and the same was applied around the desired part of the bottle, whereupon the unit was warmed up so that the sleeve was shrunk tight and formed in accordance with the shape of the bottle.

So far, however, no packing containers are known in which use is made of the thermoforming characteristics of the above-mentioned material in an optimum manner, so as to produce a package, the container body of which consists exclusively of the said material. Such a container should present manufacturer and distributor as well as consumer with many advantages, since it will be strong, light and cheap. Beside the rules which normally apply to the shaping of packages (rules concerning the stackability, gripping facility, stability, openability, durability etc), the following two points must be observed in the manufacture of a package of the said plastic material, namely in the first place, folding of the material must be avoided, since sharp folding lines involve a weakening of the material and moreover have a detrimental effect on the stability of the finished packing container, and secondly measures which cause a lasting compression of the material must be avoided, since the joist construction of the material will then be lost, with consequent reduction in rigidity and deterioration of heat insulating capacity. These points failed to be observed in the construction of earlier known containers.

It is an object of the present invention to provide a packing container, manufactured from the said thermoformable material, which is of such a construction that the previous disadvantages are avoided and the characteristics of the material are utilized to the full.

It is a further object of the present invention to provide a packing container which can be formed by shrinking the material around a mandrel.

It is a further object of the present invention to provide a packing container, in the manufacture of which the material is utilized without the occurrence of any appreciable waste.

These and other objects have been achieved in accordance with the invention in that a packing container of the type described in the beginning was given the characteristic, that the end plate of the container comprises a material plate located in the tubular container part and near to the one end of the same, the peripheral area of which material plate is sealed to a region of the tubular container part folded in by shrinkage to fit against the underside of the material plate.

A method for the manufacture of this packing container has been given the characteristic in accordance with the invention that a material strip is formed to a cylinder, whereupon the ends of the strip are sealed to one another, so as to form the tubular container part, that a material plate adapted to the shape and size of this container part is introduced into one end of the same, which end through heating is made to shrink and partly to enclose the material plate, whereupon the plate and the end of the tubular container part are sealed to one another.

Figure 2:
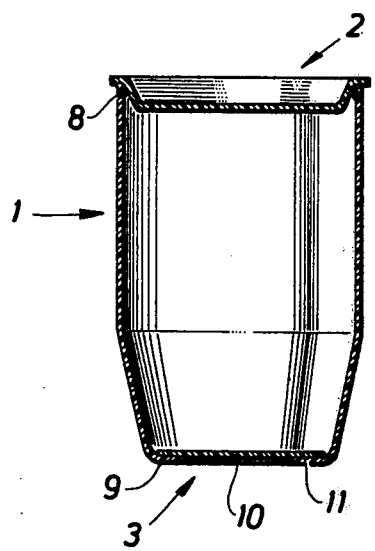
Figure 3:
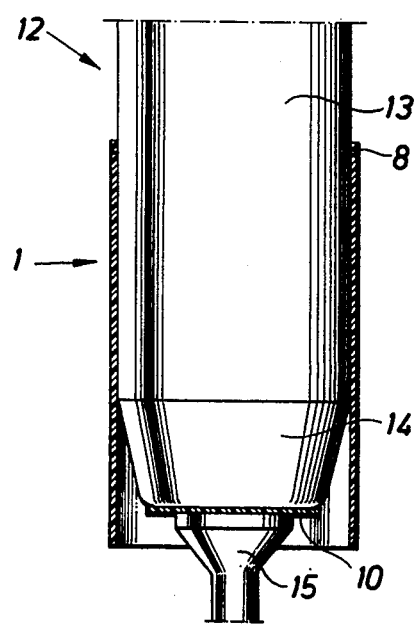

The invention will be described in detail in the following with reference to the enclosed schematic drawing, wherein FIG. 1 shows in perspective view a packing container provided with lid in accordance with the invention, FIG. 2 shows the packing container in accordance with FIG. 1 in cross-section, and FIG. 3 illustrates an instant during the manufacture of a packing container in the manner in accordance with the invention.

The packing container in accordance with the invention is manufactured from a laminated material which has a central carrier material of foamed plastics and a homogeneous plastics layer situated on either side of this. The plastic material may consist e.g. of polyethylene or polystyrene. The material is formable by a shrinking process based on the effect of heat and can be sealed, in that at least the surface layer in the portions which are to be sealed to one another are heated to softening, whereupon they are pressed together.

The packing container shown in FIG. 1 comprises a substantially tubular wall part 1 and two end plates 2 and 3 respectively. The tubular wall part 1 has an upper, substantially cylindrical part 4 and a lower substantially conical part 5, which tapers off downwardly in the direction of the end plate 3 which constitutes the bottom of the package. The tubular container part 1 is manufactured from a rectangular material strip, the short ends of which are sealed to one another, and the package has therefore a vertical overlap joint 6 which extends over the entire height of the package (FIG. 1). At the upper end of the joint 6 is a lug 7 which is not attached to the underlying material and which projects from the overlap joint and runs substantially adjoining the underlying material. This lug 7 serves for the opening of the package as a pull flap and is therefore connected to a tearing thread 8 located around the upper end of the package and directly below the end plate or lid 2. The tearing thread 8 is partially embedded in the inner homogeneous layer forming the tubular container part 1 and extends therefore also out into the pull lug 7 formed by the packing material.

The lower, conical end 5 of the tubular container part 1 is closed at the bottom by a shrunk edge 9, which fits against and is sealed to a material plate 10 introduced into the bottom end of the tubular container part 1. The shrunk edge 9 is sealed in an overlap joint 11 to a circumferential edge area of the lower surface of the material plate 10.

The upper end plate 2 or lid of the packing container is constituted by a lid with recessed inner part adapted to the diameter of the upper tubular part 4 of the packing container. The lid is butt welded to the top edge of the tubular packing container 1. On opening of the packing container by pulling in the projecting pull lug 7, the lid as well as the part of the package located between the lid and the tearing thread 8 are detached.

In the manufacture of the above described packing container by making use of the method in accordance with the invention, the container is formed around a mandrel 12 (FIG. 3). The mandrel has a shape corresponding to the shape of the tubular container part 1, that is to say an upper cylindrical part 13 and a lower, truncated conical part 14. The bottom end of the mandrel 12 is substantially plane and joins onto the conical part 14 of the mandrel via a rounded, circumferential edge. The diameter of the cylindrical mandrel part 13 corresponds to the desired inside diameter of the finished package.

The manufacturing procedure itself is started in that a rectangular material strip is heated up and is wrapped round the cylindrical part 13 of the mandrel 12. The material strip has a length so adapted to the periphery of the mandrel 12, that the strip ends after completion of the wrapping round extend somewhat over one another. The ends overlapping one another are then heated up, so that the surface layer of the material softens, whereupon they are pressed together to form the vertical overlap joint 6. The tubular and cylindrical part 1 so formed is then displaced in relation to the mandrel, so that a portion at the one end of the cylindrical part 1 extends beyond the lower end of the mandrel 12. To this lower end of the mandrel is placed with the help of a device 15 fitted up with a suction head the material plate 10 mentioned earlier and is retained there in a suitable manner, e.g. by means of a vacuum. Then the tubular part 1 and the peripheral area of the material plate 10 are heated up. On doing this the tubular part 1 will shrink, which has the effect that its upper part situated on the cylindrical portion 13 of the mandrel 12 will accurately fit to the latter. The bottom part of the container part 1, situated below the transition between the cylindrical part 13 of the mandrel 12 and the conical part 14 of the mandrel 12, will, owing to the heating up, also shrink and in doing so it will accurately fit to the conical part 14. The portion located at the bottom edge is heated particularly strongly and will through shrinkage be folded in over the peripheral area of the material plate 10 fitting against the bottom surface of the mandrel 12.

To ensure a tight seal between the peripheral surface of the material plate 10 and the folded in edge of the container part 1, and so as to provide an appropriate shaping of the bottom surface of the packing container, it is recommended to press a device, moulding the outside of the container base, against the folded in edge. Since the edge as well as the peripheral area of the plate are heated up specially strongly, a circumferential, impermeable overlap joint is achieved between the plate 10 and the container part 1 at the same time as the folded in edge 9 is given an even surface so that the packing container stands steadily.

After this operation the packing container is drawn off the mandrel and is placed on a conveyor belt, on which it is taken to a filling station where it is filled with a suitable amount of the desired contents. Finally the filled container passes a lid fitting station, where the upper edge of the container is heated up and the prefabricated lid is joined onto it by means of a butt weld. Finally the finished, filled packing containers are placed into transport packages or the like.

The general, relatively gentle heating for making the rectangular material blank bendable and formable, as well as the more vigorous heating on producing the overlap joints and the forming of the bottom, may both be carried out by applying hot air to the parts which are to be heated. Naturally it is also possible to use radiant heat or the like.

The embodiments of the invention described here together with the method for its manufacture has proved to be very advantageous, but it is of course possible to modify within the scope of the following patent claims the package as well as the method for the manufacture of the packages.

The material plate 10 facilitates the forming of an impervious bottom part and makes it possible to form packages with considerable diameter, since the folding zone remains invariably narrow. This makes it also simpler to produce an even and impervious base.

The tearing thread located at the upper end of the package may be situated in the inner homogeneous plastic layer from the start, and does not affect, nor is damaged by, the forming operations in accordance with the invention. Naturally it is also possible to omit the tearing thread, if some other opening arrangement is considered appropriate, e.g. a pull-off strip arranged on the lid which covers a punched out pouring opening.

I claim:

1. A method for making, filling and sealing packing containers for liquids composed of a heatshrinkable laminated material having a base layer of foamed plastic and at least one layer of a thermoplastic, heatsealable material, said method comprising:

wrapping a strip of the laminated material about a cylindrical mandrel to overlap the opposed ends of the strip, heating the overlapping end portions of the strip to heat seal the strip end portions together to form a tubular member, moving said tubular member relative to the mandrel so that one end thereof extends beyond the corresponding end of said mandrel, placing a bottom forming plate member against the end of the mandrel, the plate member having a diameter not greater than the diameter of the end of the mandrel, heating the extended end of the tubular member of laminated material to shrink the extended end portion of the tubular member inwardly to embrace the marginal surface of the plate member and to heat seal the inwardly shrunk end of the tubular member to the marginal surface of the plate member to form a seal, applying pressure to the end of the tubular member and plate member while still in a heated condition, to provide a liquid tight seal therebetween and to provide the base portion of the container with a flat, substantially uniform surface for stability, removing the container from the mandrel, filling the container with liquid contents, heating the upper edge of the container to a heat-sealing temperature, and pressing a lid member thereonto in abutting relation to the heated upper edge of the filled container to form a liquid-tight butt seal therewith.

2. A method as claimed in claim 1 wherein the heating of the overlapping portions of the strip of laminated material and the heating of the extended end of the tubular member are carried out with heated air.

3. A method for making, filling and sealing packing containers to liquids composed of a heat shrinkable laminated material having a base layer of foamed plastic material and at least one layer of a thermoplastic, heat sealable material, said method comprising:

wrapping a strip of the laminated material about the cylindrical portion of a cylindrical mandrel having a truncated conical portion at one end thereof to overlap the opposed ends of said strip, heating the overlapping end portions of the strip to heat seal the strip end portions together to form a tubular member, moving said tubular member relative to the mandrel so that one end thereof extends beyond the conical end portion of said mandrel, placing a bottom forming plate member against the truncated conical end of the cylindrical mandrel, the plate member having a diameter not greater than the diameter of the truncated conical end of the mandrel, heating the extended end of the tubular member of laminated material to shrink the laminated material to conform with the conical portion of the mandrel and to shrink the extended end portion of the tubular member inwardly to embrace the marginal surface of the plate member and to heat seal the inwardly shrunk end of the tubular member to the marginal surface of the plate member to form a seal, applying pressure to the end of the tubular member and plate member while still in a heated condition to provide a liquid tight seal therebetween and to provide the base portion of the container with a flat, substantially uniform surface for stability, removing the container from the mandrel, filling the container with liquid contents, heating the upper edge of the container to a heatsealing temperature, and pressing a lid member thereonto in abutting relation to the heated upper edge of the filled container to form a liquid-tight butt seal therewith.

* * * * *